United States Patent
Yamagishi et al.

(10) Patent No.: US 6,466,294 B1
(45) Date of Patent: Oct. 15, 2002

(54) LIQUID CRYSTAL DISPLAY PANEL USING SEALING ADHESIVE CONTAINING CONDUCTIVE PARTICLES

(75) Inventors: Nobuyasu Yamagishi; Eiji Yamamoto, both of Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/478,675

(22) Filed: Jan. 6, 2000

(30) Foreign Application Priority Data

Jan. 6, 1999 (JP) .......................... 11-001126

(51) Int. Cl.[7] .................. G02F 1/1345; G02F 1/1339
(52) U.S. Cl. .................. 349/155; 349/153; 349/149; 349/156; 430/7; 29/830
(58) Field of Search .................. 349/155, 153, 349/149, 156; 430/7; 29/830

(56) References Cited

U.S. PATENT DOCUMENTS

| | | | | |
|---|---|---|---|---|
| 4,600,273 A | * | 7/1986 | Ohno | .................. 349/155 |
| 5,001,302 A | * | 3/1991 | Atsumi | .................. 174/94 R |
| 5,235,741 A | * | 8/1993 | Mase | .................. 29/830 |
| 5,417,094 A | * | 5/1995 | Sato et al. | .................. 430/7 |
| 5,636,329 A | * | 6/1997 | Sukegawa et al. | .......... 349/149 |
| 5,710,612 A | * | 1/1998 | Mase | .................. 349/149 |
| 5,973,763 A | * | 10/1999 | Fujimura et al. | ........... 349/156 |
| 6,208,399 B1 | * | 3/2001 | Ohta et al. | |

FOREIGN PATENT DOCUMENTS

| | | |
|---|---|---|
| JP | 63-29729 | 2/1988 |
| JP | 10-282515 | 10/1998 |

* cited by examiner

Primary Examiner—William L. Sikes
Assistant Examiner—Julie Ngo
(74) Attorney, Agent, or Firm—RatnerPrestia (57) ABSTRACT

A liquid crystal display panel with a narrow frame, fabricated by eliminating the space required for applying conductive paste. Sealing adhesive containing conductive particles is applied along a rim between the two substrates and constituting a liquid crystal panel. A common electrode on the second substrate and a electrode connecting terminal on the first substrate are electrically connected through the conductive particles in the sealing adhesive. An insulation film made of an organic material is provided at an area of the sealing adhesive for covering conductors at least at a portion where conductors on the first substrate and facing common electrode on the second substrate overlap. This configuration enables to eliminate the use of conductive paste conventionally required for connecting the facing common electrode and facing electrode connecting terminal.

8 Claims, 8 Drawing Sheets

LIQUID CRYSTAL DISPLAY PANEL USING SEALING ADHESIVE CONTAINING CONDUCTIVE PARTICLES

FIELD OF THE INVENTION

The present invention relates to the field of liquid crystal display panels, and more particularly to liquid crystal display panels having a narrow picture frame outside the display area.

BACKGROUND OF THE INVENTION

A widening range of sizes, from small to large, of liquid crystal display panels is being manufactured in response to the broadening array of applications in which they are being used. In particular, liquid crystal display panels are being increasingly commercialized in an unprecedented variety of applications that exploit their advantages of being light, thin, and small. Such applications include notebook PCs with large display screens in proportion to their size (large effective screen percentage, and narrow picture frame), and liquid crystal display panels for car navigation using the maximum screen size within the provided mounting area. Studies on minimizing the width of the screen periphery (hereafter referred to as the 'frame') are actively proceeding.

One configuration example of a conventional liquid crystal display panel with a narrow frame is described next with reference to drawings.

Figure 7:
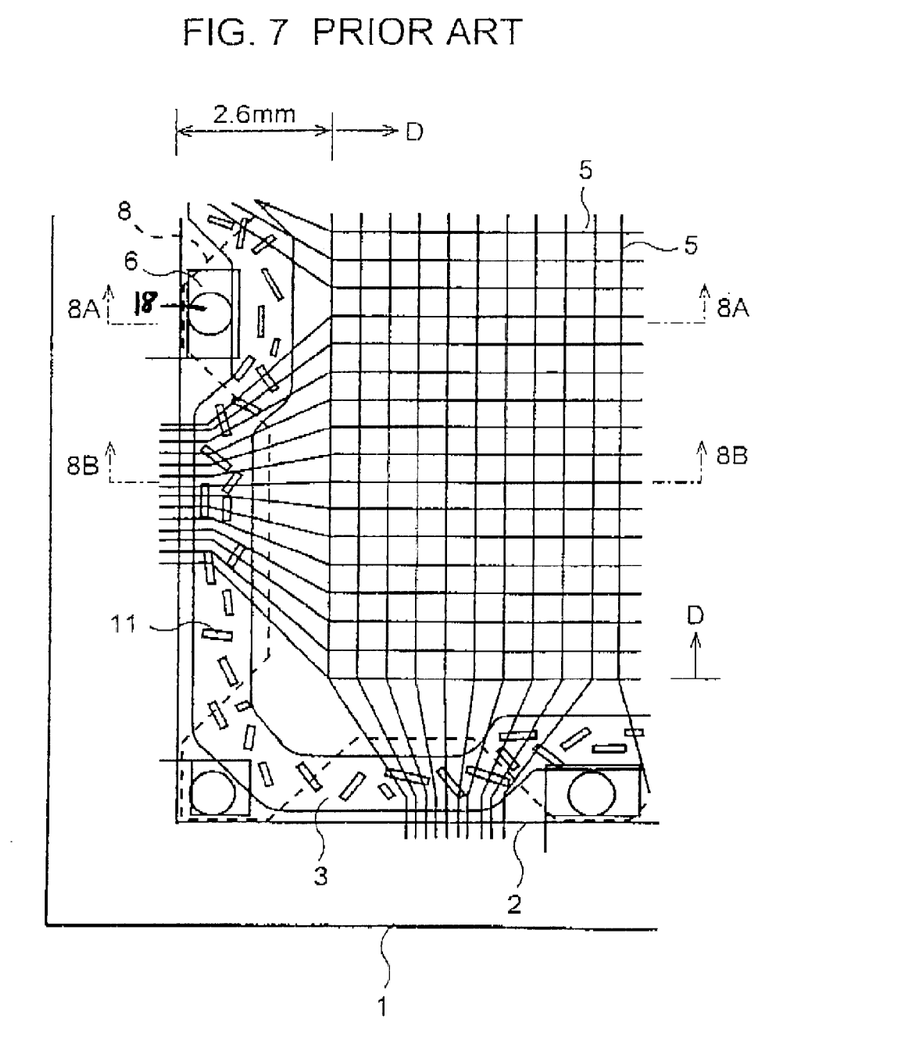
FIG. 7 is a plan view of a part of the periphery of a general TFT active matrix color liquid crystal display panel of the prior art.
Figure 8A:
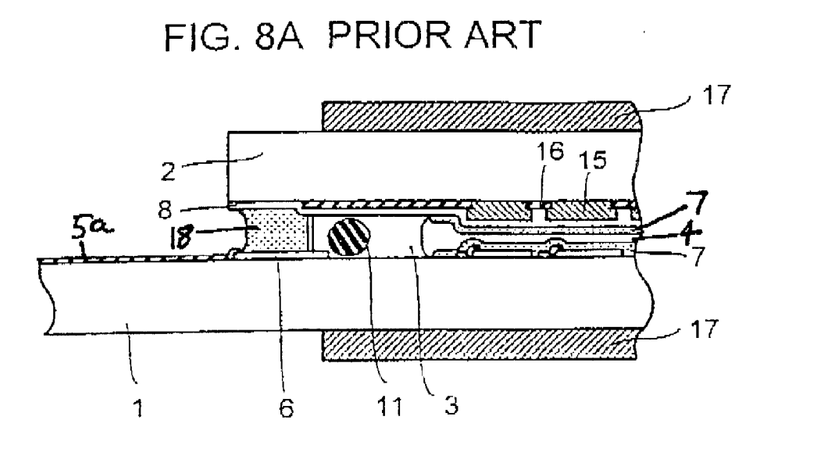
FIGS. 8A and 8B are sectional views taken along lines 8A—8A and 8B—8B in FIG. 7.

FIG. 7 shows a plan view of a part of the periphery of a general thin film transistor (TFT) active matrix color liquid crystal display panel. FIG. 8A shows a sectional elevation view taken along the line 8A—8A in FIG. 7, and FIG. 8B shows a sectional elevation view taken along 8B—8B in FIG. 7.

Figure 8B:
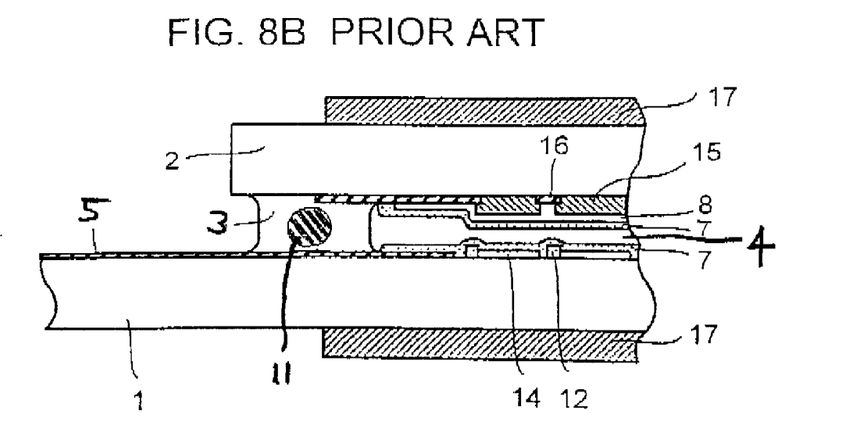

As shown in FIGS. 7, 8A, and 8B, a typical liquid crystal display panel of the prior art includes a first and a second substrate with a liquid crystal material therebetween. The second substrate 2 is made of glass and is cut out to be smaller than the first substrate 1, also made of glass. A common electrode 8 on the second substrate 2 is connected to a connecting terminal electrode 6 provided on the first substrate 1 using conductive paste 18. Power is supplied to the common electrode from the first substrate 1. A sealing adhesive 3 is applied to the periphery of the substrates for sealing a liquid crystal layer between the first and second substrates. The path of the sealing adhesive 3 does not follow exactly the periphery of the first substrate but provides a number of indentations to allow placement of the conductive paste 18.

Glass fiber spacers 11 of several micrometers in diameter are mixed into the sealing adhesive 3 at a few weight percentages to secure the required gap between the two substrates.

For small panels, the conductive paste 18 in contact with the connecting terminal electrode 6 in FIG. 7 may be disposed only at the corners of the substrate and not the sides. For panels above 7 inches (medium size), conductive paste 18 is necessary also along the sides of the substrate to ensure uniformity of voltage within the panel.

In general, a narrower frame is achieved by making the sealing adhesive 3 strip narrower, reducing the distance between the end of the display area D and the sealing adhesive 3, or changing the position and reducing the area on which to apply the conductive paste 18.

However, it making the sealing adhesive strip 3 narrower is limited to a certain minimal width to maintain adhesion strength and moisture resistance. The distance between the end of the display area D and the sealing adhesive 3 is also limited to a certain minimal width because of limitations in application accuracy of the sealing adhesive 3 or disorder in the orientation of liquid crystal at the ends of sealing, or at the ends of an orientation film 7. Furthermore, if the position where the conductive paste 18 is applied is set too far towards the outer edge of the substrate, it may cause defect in the glass cutting step due to interference with the cut line of the second substrate 2. If the position is too far inside the edge, the conductive paste 18 mixes with the sealing adhesive 3, and may destroy the sealing. To secure an electrical connection, reduction of the area of the conductive paste 18 may also be limited to a certain minimal area.

Use of a higher purity conductive paste 18 in the liquid crystal layer 4 has also been tried. However, this measure still requires the conductive paste 18 to be applied outside the display area D, and further requires a certain distance to be maintained between the conductive paste 18 and display area D since the non-orientation region of liquid crystal occurs at the periphery of the conductive paste, resulting in little improvement in narrowing the frame.

Although there is an increasing demand for narrower frames, a minimum width of 0.8 mm is necessary due to the presence of conductive paste on the sides of the substrate.

To counteract this limitation, Japanese Laid-open Patent No. S63-29729 discloses a method for adding conductive material to the sealing adhesive, instead of the application of a separate conductive paste, to allow electrical connection between the common electrode on the second substrate and the connecting terminal electrode on the first substrate. This configuration, however, risks a short-circuit between the common electrode on the second substrate and the various other conductors on the first substrate, resulting in difficulty in narrowing the frame.

SUMMARY OF THE INVENTION

The present invention aims to offer a liquid crystal display panel with a narrow frame, even for active matrix liquid crystal display devices with many complicated wiring.

A liquid crystal display panel according to the present invention includes a first substrate having pixel electrodes, conductors for applying voltage to the pixel electrodes, and connecting terminal electrodes; a second substrate opposite said first substrate and spaced therefrom having common electrodes, and a sealing adhesive. The sealing adhesive contains conductive particles at a predetermined density, and seals the space between the first and second substrates along approximately the entire circumference for sandwiching a liquid crystal layer between the first and second substrates. The conductive particles in the sealing adhesive electrically connect the connecting terminal electrodes on the first substrate and the common electrodes on the second substrate.

The liquid crystal display panel of the present invention further includes a sealing adhesive containing spherical conductors dispersed approximately uniformly at a predetermined concentration along the periphery between the two substrates. The spherical conductors in the sealing adhesive electrically connect the common electrodes on the second substrate and the connecting terminal electrodes on the first substrate. An insulation film is provided over the conductors of the first substrate at least at the area where the conductors on the first substrate and the common electrodes on the second substrate overlap.

With the above configuration, spherical conductors in the sealing adhesive electrically connect common electrodes on the second substrate to connecting terminal electrode on the first substrate. The insulation film provided over the other conductors insulates the conductors on the first substrate from the common electrodes on the second substrate. The conventional need for connecting them using the conductive paste is eliminated. Thus, the need for allowing an area in the frame for the conductive paste is eliminated. Accordingly, a liquid crystal display panel with a narrower frame is made possible.

Furthermore, by placing the connecting terminal electrodes of the first substrate on the insulation film enables designing a larger area for the connecting terminal electrode. Since the formation of the connecting terminal electrode is the last step in fabricating the first substrate, a residue will not remain on a film surface. This assures good electrical connection, and reduces the connection resistance with the common electrodes on the second substrate.

DESCRIPTION OF THE PREFERRED EMBODIMENTS

Exemplary embodiments of the present invention are described next in detail with reference to drawings, where similar numbers indicate similar parts in all figures:

First Exemplary Embodiment

Figure 1:
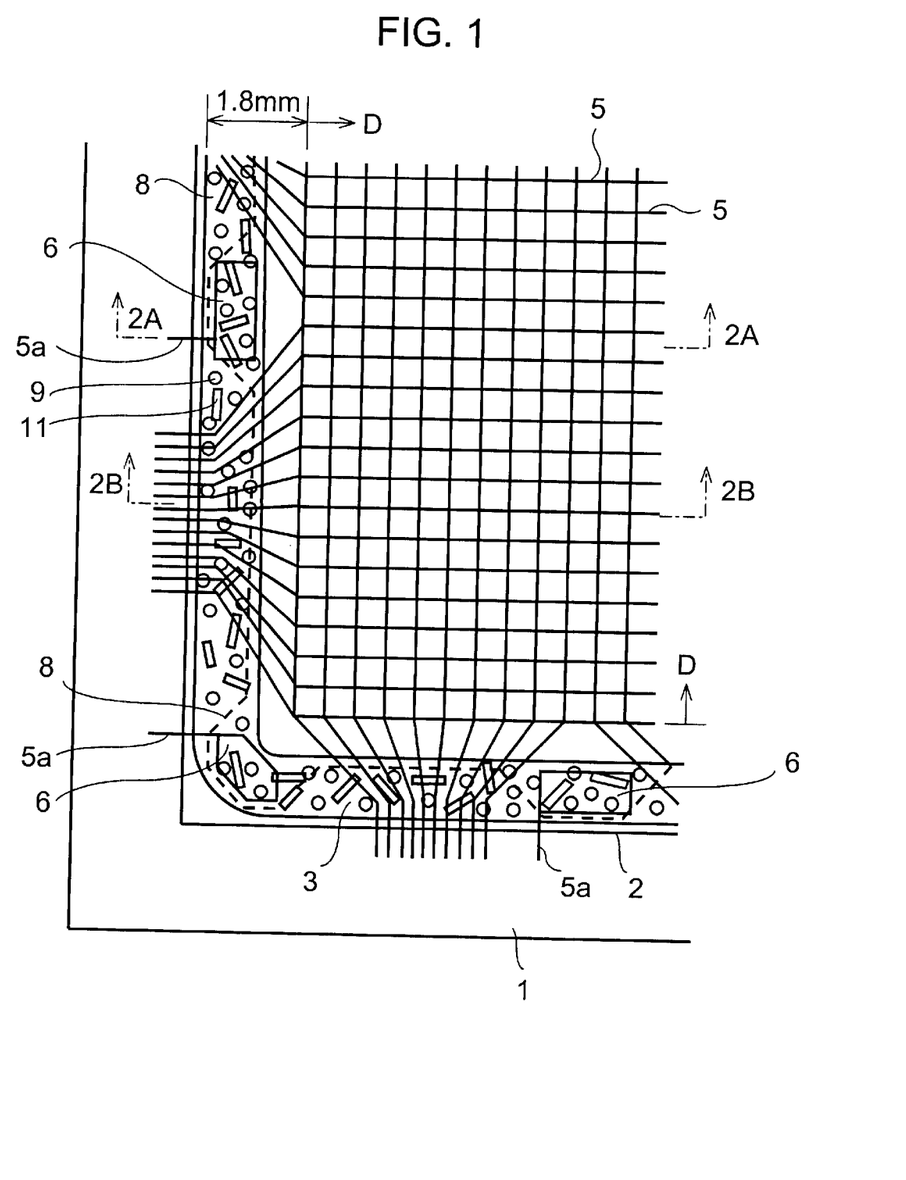
FIG. 1 is a plan view of a part of the periphery of a TFT active matrix color liquid crystal display panel in a first exemplary embodiment of the present invention.
Figure 2A:
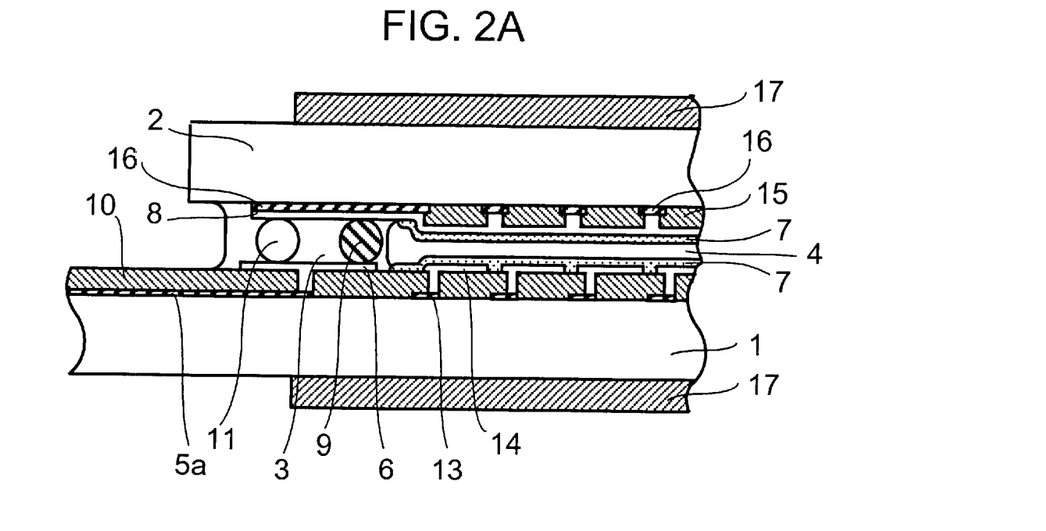
FIGS. 2A and 2B are sectional views taken along lines 2A—2A and 2B—2B in FIG. 1.

FIG. 1 shows a plan view of a part of the periphery of a TFT active matrix color liquid crystal display panel in a first exemplary embodiment. FIG. 2A is a sectional view taken along line 2A—2A in FIG. 1, and FIG. 2B is a sectional view taken along line 2B—2B in FIG. 1.

Figure 2B:
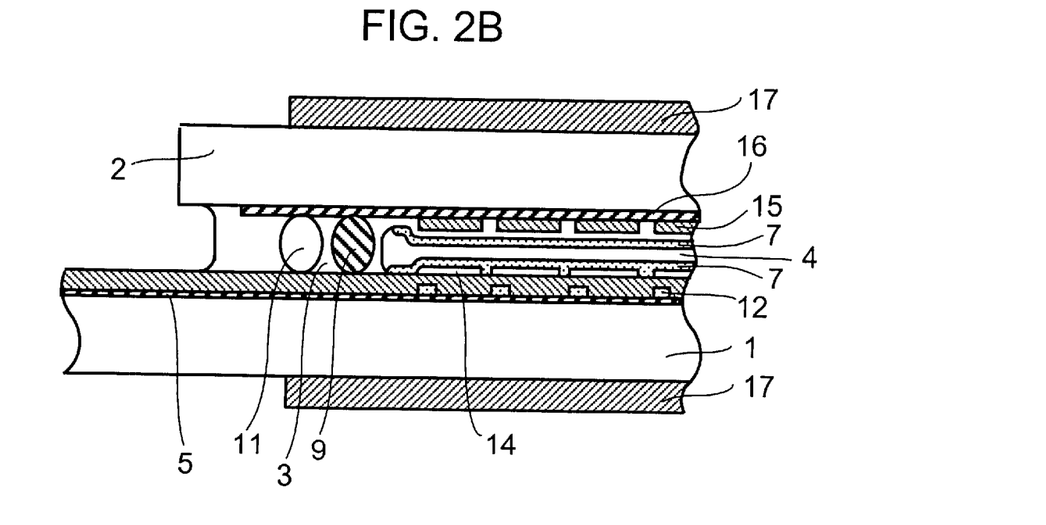

In FIGS. 1, 2A, and 2B, a polarizer 17 is attached outside a first substrate 1 made of a transparent non-alkali glass and a second substrate 2 also made of a transparent non-alkali glass.

The display area D is formed by sandwiching a liquid crystal layer 4 between the first and second substrates 1 and 2. The first substrate 1 includes conductors 5, 5a made of a thin metal film, TFT 12 connected to the conductors 5, an electrical insulation film 10 made of an organic material formed on the conductors 5, 5a (here, the thickness of acrylic resin film is about 2.0 μm), and a pixel electrode 14 made of a transparent conductive film for each pixel dot connected to a drain electrode 13 through a connecting hole in the insulation film. The second substrate 2 includes a color filter 15 for each pixel dot, a black matrix 16 for blocking the light from the non-display portion, and a common electrode 8 made of a transparent conductive film 10.

A sealing adhesive strip 3 is formed 0.3 mm inside the outer rim of the second substrate along approximately its entire circumference. This sealing adhesive 3 contains conductive spheres 9 approximately 6.5 μm diameter. The spheres are made of gold plated resin spheres and comprise a ratio of 3 weight percents of the sealing adhesive. At the same time, cylindrical non-conductive glass fiber spacers 11 which are approximately 6.0 μm thick and 50 to 100 μm in length are mixed in at the ratio of 3 weight percents of the sealing adhesive. The width of this sealing adhesive strip 3 is about 1.0 mm.

An orientation film 7 is applied to an inner face of the first and second substrates up to the inner edge of the sealing adhesive 3. The orientation film 7 is formed in a way so as basically not to overlap with the area of the sealing adhesive 3, because the orientation film 7 adheres only weakly to the adhesive.

However, because the sealing adhesive 3 and orientation film 7 may overlap as a result of spreading during production, to secure sufficient adhesion, any deviation of sealing width and application position may need to be carefully controlled.

In the same way, the transparent conductive film forming the common electrode 8 should also be disposed so as to reduce overlap of the common electrode 8 on the second substrate 2 and sealing adhesive 3. However, since the adhesion to the transparent conductive film is stronger than that of the orientation film 7, partial overlap of the transparent conductive film and the sealing adhesive 3 is acceptable.

In order to narrow the frame of the liquid crystal display panel as much as possible, the distance from the end of the display area D to the inner end of the sealing adhesive 3 is set to the minimum required dimensions for preventing pattern irregularity, commensurate with the application position accuracy of the sealing adhesive 3, and application position accuracy of the orientation film 7, to prevent disorder in orientation at pattern ends of the orientation film 7. In the first exemplary embodiment, the distance from the display area to the inner end of the sealing adhesive 3 is set to about 0.6 mm wide.

The conductors 5 of the first substrate 1 cross an area of the sealing adhesive 3. In this exemplary embodiment, the conductors 5 crosses the sealing adhesive 3 at an angle to allow 240 conductors to be bundled together. (Hereafter a bundle of conductors is called a block. The number of conductors in the figures is reduced for simplicity.) The conductors 5 are located underneath the 2.0 μm thick electrical insulation film 10, and do not contact the conductive spheres 9 in the sealing adhesive 3.

The connecting terminal electrodes are provided at screen corners and between the blocks. The connecting terminal electrode 6, made of a transparent conductive film, is formed On the insulation film 10 of the first substrate 1. Here, a contact hole is provided in advance in the insulation film 10 for providing electrical contact between the connecting terminal electrode 6 and the conductor 5a as shown in FIG. 2A. An extension of the common electrode 8 (refer to the dotted line in FIG. 1) extends substantially over the connecting terminal electrode. The conductive sphere 9 in the sealing adhesive 3 is sandwiched between the connecting terminal electrode 6 and the extension of the common electrode 8 to provide an electrical connection between them. This configuration enables voltage to be supplied from the first substrate to the common electrode 8 of the second substrate 2.

As described above, the first exemplary embodiment enables the achievement of a liquid crystal display panel with a narrow frame by eliminating the use of the conductive paste 18 which was required in the prior art, and consequently eliminating the space required for applying the conductive paste. This configuration further ensures stable quality and reliability equivalent to that of the prior art by securing sufficient sealing width and connecting area with the electrode. In particular, provision of the insulation film 10 on the first substrate 1 with a predetermined film thickness ensures electrical insulation even if conductors 5 and common electrode 8 overlap in the area of the sealing adhesive 3 containing the conductive spheres 9 in the plan view. This configuration is thus applicable to active matrix color liquid crystal display panels which involve a large number and complicated wiring. In addition, elimination of the application of the conductive paste 18 improves productivity.

In the plan view of FIG. 1, the shape of the common electrode 8 may be designed to avoid an overlap with the conductors 5 at an area where the sealing adhesive 3 is applied. However, since the resistance of the transparent conductive film used for the common electrode 8 is high, and electrical continuity in the connection may be lost due to cracks, it is not recommended to design the common electrode 8 with the contact extensions overly thin or with a complicated shape. In addition, the normal method for fabricating the color filter substrate, which is the second substrate 2, may not ensure sufficiently good accuracy in the positioning of the common electrode 8. Furthermore, the common electrode 8 needs to be in the display area D, which makes the common electrode 8 likely to overlap with the sealing adhesive 3 in panels with a narrow frame. Accordingly, it is preferable to provide the insulation film 10 to prevent short-circuits wherever the common electrode 8 and conductors 5 overlap in the area of the sealing adhesive 3.

A method for manufacturing the liquid crystal panel of the present invention is briefly described next. The first and second substrates 1 and 2 are accurately aligned and sealed, sandwiching the sealing adhesive 3 containing glass fiber spacers 11 and conductive spheres 9, and pressed until the thickness of the sealing adhesive 3 becomes approximately equivalent to the diameter of the glass fiber spacer 11, while heating at 150° C. for approximately 10 minutes to thermally cure the sealing adhesive 3. Then, both substrates are cut to the predetermined dimensions, and liquid crystal is vacuum injected from an inlet provided in the sealing adhesive. The inlet is sealed with UV resin to complete the half-finished liquid crystal panel.

During sealing of the first and second substrates 1 and 2, a predetermined pressure is applied to adjust the thickness of the sealing adhesive strip 3 to approximately the diameter of the glass fiber spacers 11 (6.0 μm in the first exemplary embodiment). The major material of the conductive spheres 9 being resin, the spheres deform when the pressure is applied to them, as described above, squeezing spheres with a diameter of 6.5 μm in the space of 6.0 μm. This condition is maintained by curing the sealing adhesive.

By squeezing and deforming the conductive spheres 9 to a predetermined degree, a connection of the electrodes on the upper and lower substrates is secured. Connection resistance may be reduced by increasing the contact area due to deformation of conductive spheres 9.

The degree of deformation of the conductive spheres 9, that is, the difference between the diameters or thickness of the glass fiber spacers 11 and conductive spheres 9, may be necessary to be optimized by the compression elasticity of the conductive spheres 9 and sealing pressure. However, if the conductive spheres 9 are too forcibly deformed, the conductive spheres may puncture the insulation film 10 on the first substrate 1, and short-circuit with the conductors 5. Accordingly, the difference in the diameters of each of the glass fiber spacers 11 and conductive spheres 9 may preferably be set to less than the film thickness of the insulation film 10. It is also preferable to set the diameter difference so that the diameter of each of the conductive spheres 9 is up to 20% larger than the diameter of each of the glass fiber spacers 11.

As described above, the first exemplary embodiment has achieved a short distance of 1.8 mm between the display screen edge to the second substrate edge. In the prior art, the dimensions of the same part would be 2.6 mm assuming the width of the sealing adhesive strip 3 and other conditions to be the same. The first exemplary embodiment has thus achieved a drastically narrower frame for the liquid crystal panel.

The conductive spheres 9 mixed into the sealing adhesive are not necessarily spheres. In general, any conductive particles are acceptable. For example, cylindrical conductors or spacers coated with conductors may be employed. Spherical conductors are preferable, however, to reduce the likelihood of breakage of the insulation film 10, which would then result in short-circuiting between the conductors 5 and common electrode 8. The spheres 9 may comprise aluminum.

Resin spheres or glass spacers may also be mixed in the sealing adhesive instead of glass fiber spacers 11.

In the first exemplary embodiment, organic material is used for the insulation film 10. Inorganic material may also be used for forming the insulation film.

Second Exemplary Embodiment

Figure 3:
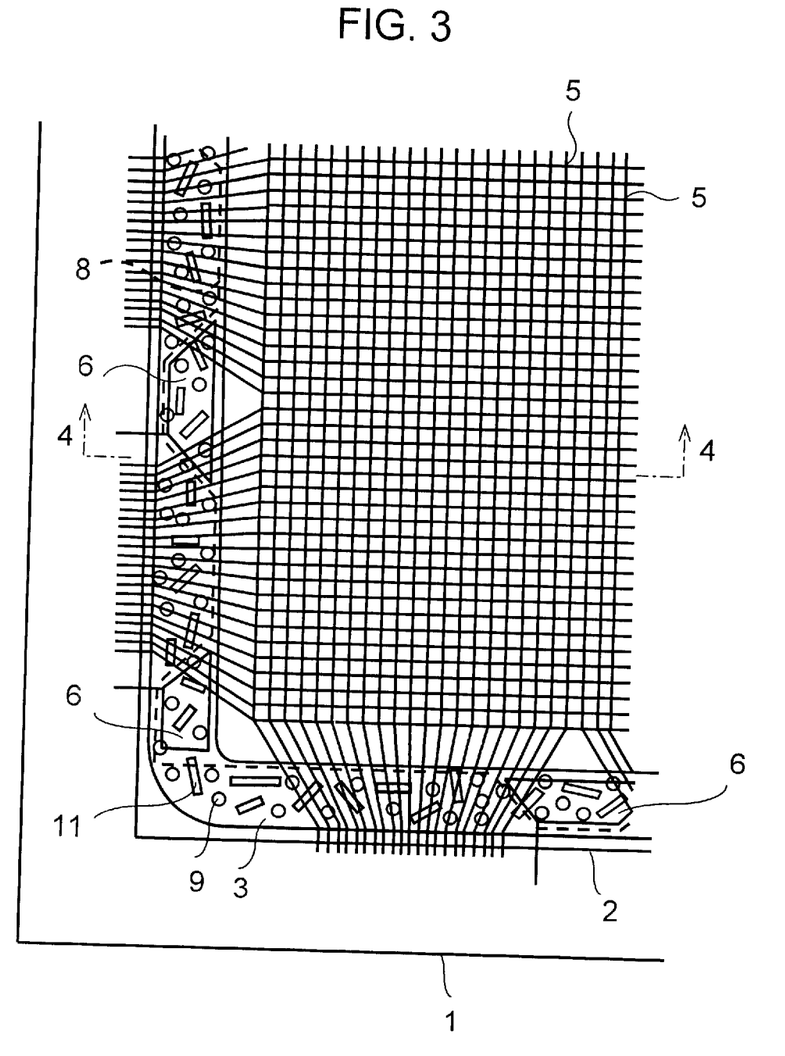
FIG. 3 is a plan view of a part of the periphery of a TFT active matrix color liquid crystal display panel in a second exemplary embodiment of the present invention.
Figure 4:
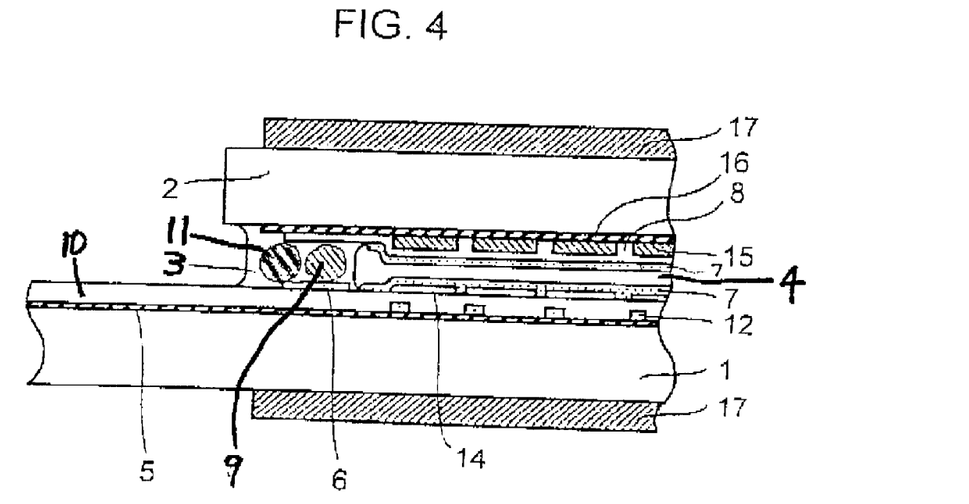
FIG. 4 is a sectional view taken along line 4—4 in FIG. 3.

FIG. 3 shows a plan view of a part of the periphery of the TFT active matrix color liquid crystal display panel in a second exemplary embodiment. FIG. 4 is a sectional view taken along line 4—4 in FIG. 3.

The configuration of the second exemplary embodiment is effective when there is insufficient space for the connecting terminal electrode 6 due to extremely narrow pixel dot pitch for high definition display and a high number of conductors 5 tightly packed crossing the sealing adhesive 3.

As shown in FIGS. 3 and 4, the conductors 5 and connecting terminal electrode 6 partially overlap on the first substrate 1. However, the conductors 5 and connecting terminal electrode 6 are electrically insulated by the insulation film 10, which is, preferably, a resin layer.

In addition, the extension of the common electrode 8 (refer to the dotted line in FIG. 3) on the second substrate 2 is also disposed this area through the sealing adhesive 3. Conductive spheres 9 with 5.3 μm diameter made of nickel coated resin spheres and cylindrical glass fiber spacers 11 with 5.0 μm diameter and 50 to 100 μm length are mixed in the sealing adhesive 3 at 2 weight percents respectively.

Same as in the first exemplary embodiment, the conductive spheres 9 electrically connect the connecting terminals electrode 6 on the first substrate 1 and the extension of common electrode 8 on the second substrate 2.

Accordingly, the second exemplary embodiment achieves a compact configuration which causes no problem even if the conductors 5 and connecting terminal electrode 6 overlap.

Third Exemplary Embodiment

Figure 5:
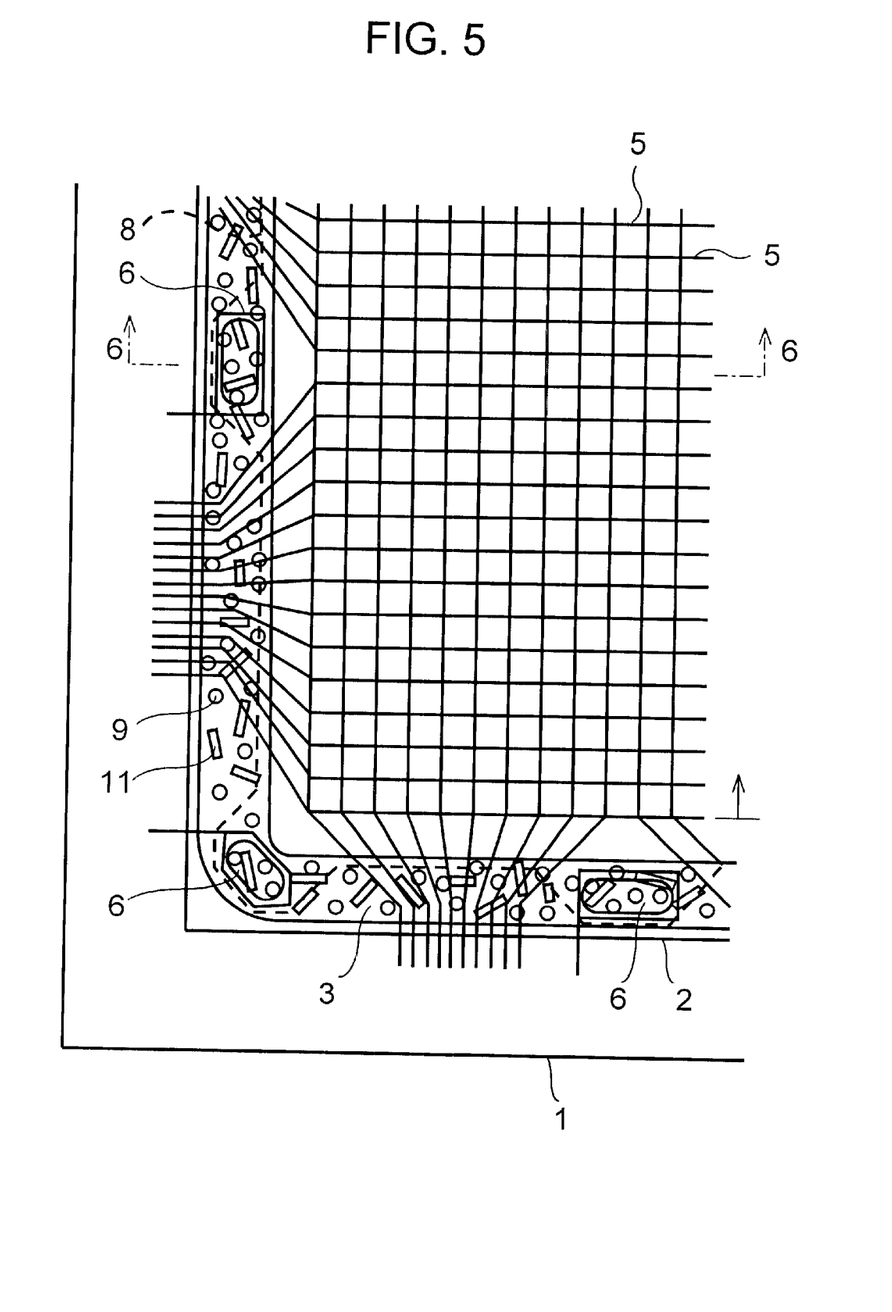
FIG. 5 is a plan view of a part of the periphery of a TFT active matrix color liquid crystal display panel in a third exemplary embodiment of the present invention.
Figure 6:
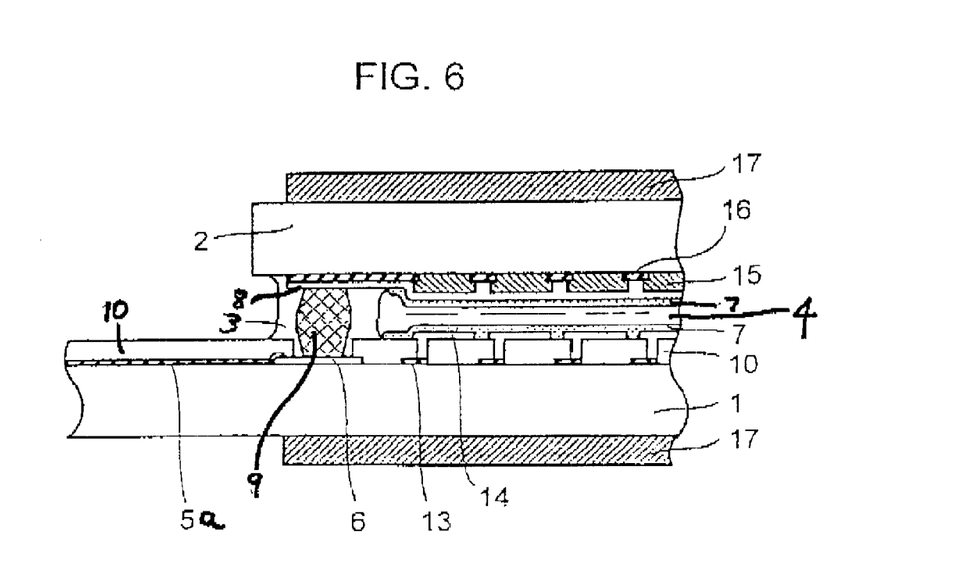
FIG. 6 is a sectional view taken along line 6—6 in FIG. 5.

FIG. 5 is a plan view of a part of the periphery of a TFT active matrix color liquid crystal display panel in a third exemplary embodiment of the present invention. FIG. 6 is a sectional view taken along line 6—6 of FIG. 5.

The basic configuration of the third exemplary embodiment is mostly the same as the first exemplary embodiment. The point which differs is that, as shown in FIG. 6, a portion of the insulation film at an area of the connecting terminal electrode 6 is removed.

In this configuration, the connecting terminal electrode 6 is disposed on the first substrate 1 without the insulation film 10 thereover. For the conductive spheres 9' in the sealing adhesive 3, aluminum spheres with 9.0 $\mu$m diameter which are likely to deform, are employed. The insulation film 10 on the first substrate 1 is 2.0 $\mu$m thick. The diameter of the glass fiber spacers 11 mixed in the sealing adhesive 3 is 6.0 $\mu$m.

As described above, aluminum conductive spheres 9 which have larger diameter and smaller compression elasticity than the organic insulation film are employed for securely connecting electrodes even if the electrode pitch of both substrates at an area of the connecting terminal electrode 6 is wide, and also for preventing damage to the organic insulation film on the conductors 5.

In the third exemplary embodiment, the connecting terminal electrode 6 is easily formed because it is made of the same metal film as the conductor materials. In addition, since the connecting terminal electrode 6 is formed on a glass substrate, connection with the conductive spheres 9 in the sealing adhesive 3 is further assured.

As described above, the present invention eliminates the use of conductive paste for connecting the common electrode on the second substrate to the connecting terminal electrode on the first substrate. Elimination of the space needed for applying the conductive paste results in offering a liquid crystal display panel with a narrower frame.

What is claimed is:

1. A liquid crystal display panel comprising:
   a first substrate comprising a plurality of pixel electrodes, a plurality of internal conductors for applying voltage to said pixel electrodes, a plurality of terminal conductors for connecting to an electrode connecting terminal;
   a second substrate opposite said first substrate comprising a common electrode;
   a sealing adhesive containing conductive particles which are conductive spacer particles and non-conductive spacer particles, the sealing adhesive forming a spacing strip along substantially the entire circumference of said second substrate for separating and bonding said first substrate and said second substrate and sandwiching a liquid crystal layer between said first substrate and said second substrate;
   said internal and terminal conductors formed on said first substrate;
   an insulation layer formed over said conductors; wherein said terminal conductors are formed in a region of said sealing adhesive;
   said insulation layer has a contact hole for providing electrical contact between said connecting terminal and said terminal conductors at an area where said terminal conductors underlie an extension of said common electrode, and
   there exists, in an area where the sealing adhesive containing the conductive particles is applied, a portion of said terminal conductors which is overlapping with said insulation layer, said electrode connecting terminal, and said common electrode,
   wherein the conducting particles electrically connect the electrode connecting terminal with the common electrode at the portion where said terminal conductors are overlapped, and
   wherein the insulation layer on said first substrate has a thickness and said thickness is greater than a difference between a diameter of at least one of said conductive spacer particles and a diameter of at least one of said non-conductive spacer particles.

2. The liquid crystal display panel as defined in claim 1 wherein said sealing adhesive further contains a plurality of cylindrical or spherical non-conductive spacer particles, said spacer particles substantially uniformly dispersed at respectively predetermined densities.

3. The liquid crystal display panel as defined in claim 1, wherein at least one said conductive particles contained in said sealing adhesive has a diameter up to 20% larger than a diameter of at least one of said non-conductive spacers.

4. The liquid crystal display panel as defined in claim 1, wherein said conductive particles contained in said sealing adhesive comprise conductive aluminum spheres.

5. The liquid crystal display panel as defined in claim 1, wherein each of said conductive particles contained in said sealing adhesive comprise a resin sphere coated with a metal.

6. The liquid crystal display panel as defined in claim 1, wherein said insulation layer on said first substrate comprises an organic material.

7. A method for fabricating a liquid crystal display panel comprising;
   forming a common electrode on a first substrate
   forming a plurality of terminal conductors on a second substrate in a region of a sealing area,
   forming an insulating layer over said plurality of terminal conductors and said second substrate,
   forming a plurality of contact terminals over said insulating layer
   forming a plurality of contact holes in said insulation layer for electrically connecting said contact terminals with said plurality of terminal conductors,
   forming a spacing strip of a sealing adhesive along substantially the entire circumference of said second substrate,
   providing in the sealing adhesive of at least one of a plurality of conductive particles having a first diameter, and at least one of a plurality of non conductive particles having a second diameter used as spacers in the sealing adhesive, and
   electrically connecting the common electrode to the contact terminals via said conductive particles by bonding and pressing the first and second substrates together,
   wherein the first diameter is larger than the second diameter, and the insulation layer has a thickness that is greater than the difference between the first diameter and the second diameter.

8. The method according to claim 7 wherein the substrate bearing the common electrode includes an orientation layer thereon, and wherein the sealing adhesive is applied adjacent said first substrate bearing the common electrode along a rim thereof as a strip of adhesive material, said strip being maintained away from said orientation layer.

* * * * *

UNITED STATES PATENT AND TRADEMARK OFFICE
CERTIFICATE OF CORRECTION

PATENT NO.     : 6,466,294 B1
DATED          : October 15, 2002
INVENTOR(S)    : Yamagishi et al.

It is certified that error appears in the above-identified patent and that said Letters Patent is hereby corrected as shown below:

<u>Title page,</u>
Item [56], References Cited, U.S. PATENT DOCUMENTS,
"5,417,094 5/1995 Sato et al." should read -- 5,418,094 5/1995 Sato et al. --

Signed and Sealed this

Twenty-ninth Day of July, 2003

JAMES E. ROGAN
*Director of the United States Patent and Trademark Office*